(12) United States Patent
Kim et al.

(10) Patent No.: US 8,527,258 B2
(45) Date of Patent: Sep. 3, 2013

(54) SIMULTANEOUS INTERPRETATION SYSTEM

(75) Inventors: Kyoung-Yup Kim, Gyeonggi-do (KR); Jun-Tai Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 844 days.

(21) Appl. No.: 12/697,465

(22) Filed: Feb. 1, 2010

(65) Prior Publication Data

US 2010/0235161 A1 Sep. 16, 2010

(30) Foreign Application Priority Data

Mar. 11, 2009 (KR) ........................ 10-2009-0020893

(51) Int. Cl.
*G06F 17/28* (2006.01)
*G10L 15/00* (2006.01)
*G10L 15/26* (2006.01)
*G10L 13/00* (2006.01)
*G10L 13/08* (2006.01)
*G10L 11/00* (2006.01)
*G10L 21/00* (2006.01)

(52) U.S. Cl.
USPC ........ 704/3; 704/2; 704/4; 704/231; 704/235; 704/258; 704/260; 704/270; 704/270.1; 704/275; 704/277

(58) Field of Classification Search
USPC ............. 704/2, 3, 4, 231, 235, 258, 260, 270, 704/270.1, 275, 277
See application file for complete search history.

(56) References Cited

U.S. PATENT DOCUMENTS

| | | | | |
|---|---|---|---|---|
| 4,882,681 A * | 11/1989 | Brotz | ................................. | 704/3 |
| 5,854,997 A * | 12/1998 | Sukeda et al. | ..................... | 704/3 |
| 5,875,422 A * | 2/1999 | Eslambolchi et al. | ............ | 704/3 |
| 5,943,398 A * | 8/1999 | Klein et al. | ................ | 379/88.13 |
| 5,966,685 A * | 10/1999 | Flanagan et al. | ................... | 704/8 |
| 5,991,711 A * | 11/1999 | Seno et al. | ....................... | 704/3 |
| 6,192,332 B1 * | 2/2001 | Golding | ........................... | 704/2 |
| 6,385,586 B1 * | 5/2002 | Dietz | ........................... | 704/277 |
| 6,722,989 B1 * | 4/2004 | Hayashi | ........................ | 463/43 |
| 7,130,801 B2 * | 10/2006 | Kitahara et al. | .............. | 704/277 |
| 7,295,963 B2 * | 11/2007 | Richardson et al. | .............. | 704/2 |
| 7,359,861 B2 * | 4/2008 | Lee | ................................ | 704/277 |
| 7,421,394 B2 * | 9/2008 | Omi et al. | ....................... | 704/277 |
| 7,461,001 B2 * | 12/2008 | Liqin et al. | ..................... | 704/277 |
| 7,707,035 B2 * | 4/2010 | McCune | ........................ | 704/270 |
| 8,069,031 B2 * | 11/2011 | Gelbman | ........................... | 704/3 |
| 2001/0029455 A1 * | 10/2001 | Chin et al. | ...................... | 704/277 |
| 2002/0046035 A1 * | 4/2002 | Kitahara et al. | .............. | 704/277 |
| 2003/0115059 A1 * | 6/2003 | Jayaratne | ....................... | 704/235 |
| 2003/0187650 A1 * | 10/2003 | Moore et al. | ................... | 704/260 |
| 2003/0208352 A1 * | 11/2003 | Lee | ................................. | 704/2 |

(Continued)

*Primary Examiner* — Edgar Guerra-Erazo
(74) *Attorney, Agent, or Firm* — Cha & Reiter, LLC.

(57) ABSTRACT

A simultaneous interpretation system includes headsets for inputting and outputting voice, and a portable terminal for receiving an original language voice speech signal to be interpreted that is output from the first headset. The portable terminal outputs an interpreted voice speech signal based on the original language voice speech signal that has been interpreted into a different language to the second headset. The portable terminal either performs the interpretation or accesses an interpretation server to provide the second headset with the interpreted voice speech signal. Hence, the simultaneous interpretation is carried out using the short-range communication between the users by medium of the single portable terminal and thus more efficient and unrestricted conversation is realized.

20 Claims, 6 Drawing Sheets

(56) References Cited

U.S. PATENT DOCUMENTS

| | | | |
|---|---|---|---|
| 2004/0092293 A1* | 5/2004 | Lee et al. | 455/563 |
| 2004/0102201 A1* | 5/2004 | Levin | 455/466 |
| 2004/0122678 A1* | 6/2004 | Rousseau | 704/277 |
| 2004/0172257 A1* | 9/2004 | Liqin et al. | 704/277 |
| 2004/0243392 A1* | 12/2004 | Chino et al. | 704/7 |
| 2006/0293893 A1* | 12/2006 | Horvitz | 704/251 |
| 2007/0225973 A1* | 9/2007 | Childress et al. | 704/211 |
| 2008/0077387 A1* | 3/2008 | Ariu | 704/3 |
| 2009/0204387 A1* | 8/2009 | Okada | 704/3 |
| 2010/0169073 A1* | 7/2010 | Almagro | 704/3 |

\* cited by examiner

SIMULTANEOUS INTERPRETATION SYSTEM

CLAIM OF PRIORITY

This application claims the benefit of priority under 35 U.S.C. §119, from a patent application entitled "SIMULTANEOUS INTERPRETATION SYSTEM" filed in the Korean Intellectual Property Office on Mar. 11, 2009 as serial No. 10-2009-0020893, the contents of which are incorporated by reference in its entirety.

BACKGROUND OF THE INVENTION

1. Field of the Invention

The present invention relates generally to a field of a simultaneous interpretation system. More particularly, the present invention relates to a simultaneous interpretation system for enabling free conversation via simultaneous interpretation using a short-range communication system between the users.

2. Description of the Related Art

Figure 1:
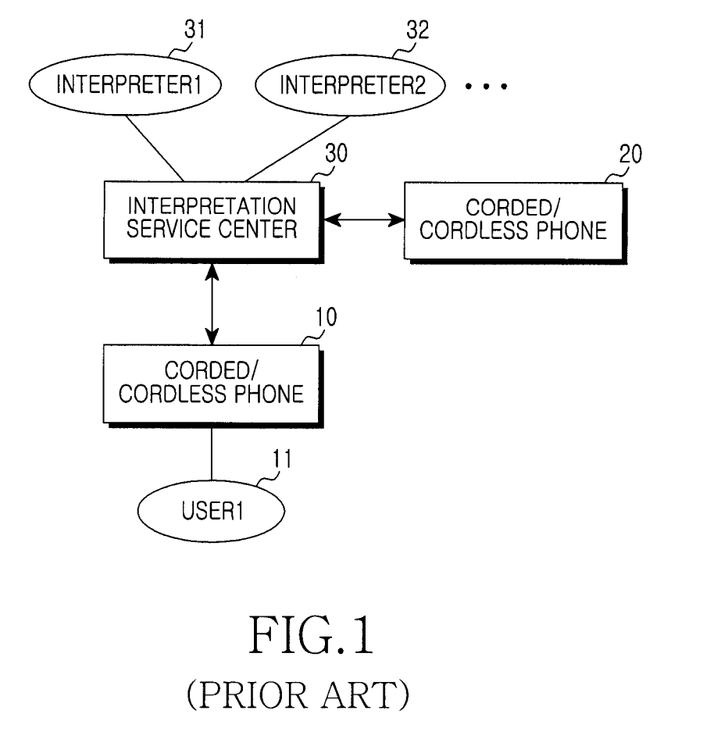
FIG. 1 is a diagram illustrating a conventional interpretation system.

FIG. 1 depicts a conventional interpretation system.

Referring now to FIG. 1, user 1 (11) and user 2 (21) of corded/cordless phones 10, 20 can make a phone call and access an interpretation service center 30 for the interpretation request and communicate with each other by way of intended language interpreters 31, 32, .... When the first user 11 sends his/her intention to the corresponding interpreter of the interpretation service center 30 over the corded/cordless phone 10, the interpreter interprets and delivers the intention of the first user 11 to the other user 21 on the corded/cordless phone 20.

In the conventional interpretation system, many of the corded/cordless phones users connect the interpretation service center for their mutually interpreted conversation. However, users who need the interpretation in a limited space will suffer from the inefficiency of the conventional interpretation system because they have to connect to the remote interpretation service center over the multiple corded/phones.

SUMMARY OF THE INVENTION

The present invention provides a simultaneous interpretation system that enables mutual simultaneous interpretations using a single portable terminal.

An exemplary aspect of the present invention is to provide a simultaneous interpretation system for simultaneous interpretation using short-range communications between users by a medium of a single portable terminal.

In accordance with an exemplary aspect of the present invention, a simultaneous interpretation system preferably includes microphones with headsets for inputting and outputting voice; and a portable terminal for receiving from the first headset an original language voice speech signal to be interpreted (translated). The portable terminal outputs an interpreted voice speech signal that is interpreted from (based on) the original language voice speech to the second headset, so that the second headset receives a voice speech signal comprising an interpreted voice speech signal that is in a different language than the original voice speech signal. Either the portable terminal or an interpretation server accessible by the portable terminal can perform the interpretation.

In accordance with another exemplary aspect of the present invention, a portable terminal includes microphones for receiving an original language voice speech signal to interpret from outside by classifying the original voice speech signal based on a first (original) language; a speaker for outputting an interpreted voice speech signal in a language different (a second language) than the original (first) language voice speech signal; and a controller for controlling interpretation of the original voice speech signal to be interpreted that is input to the microphone by using an interpretation program of the portable terminal, or by accessing an external interpretation server, and to output the interpreted voice speech signal to the speaker.

In accordance with still another exemplary aspect of the present invention, an operating method of a simultaneous interpretation system preferably includes a portable terminal and headsets which communicate with each other by wire or by wireless by medium of the portable terminal, includes outputting, at the first headset, a voice signal to interpret to the portable terminal; acquiring, at the portable terminal, an interpreted voice signal corresponding to the voice signal to interpret received from the first headset; outputting, at the portable terminal, the acquired interpreted voice signal to the second headset; and outputting, at the second headset, the interpreted voice signal received from the portable terminal.

Other exemplary aspects, advantages and salient features of the invention will become more apparent to those skilled in the art from the following detailed description, which, taken in conjunction with the annexed drawings, discloses certain exemplary embodiments of the invention in detail.

BRIEF DESCRIPTION OF THE DRAWINGS

The above features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide. Preferred exemplary embodiments of the present invention will be described below with reference to the accompanying drawings. Exemplary embodiments of the present invention provide a simultaneous interpretation system. In particular, the present invention provides a technique for the simultaneous interpretation in short-range communications between users by a medium of a single portable terminal within a limited space.

Figure 2:
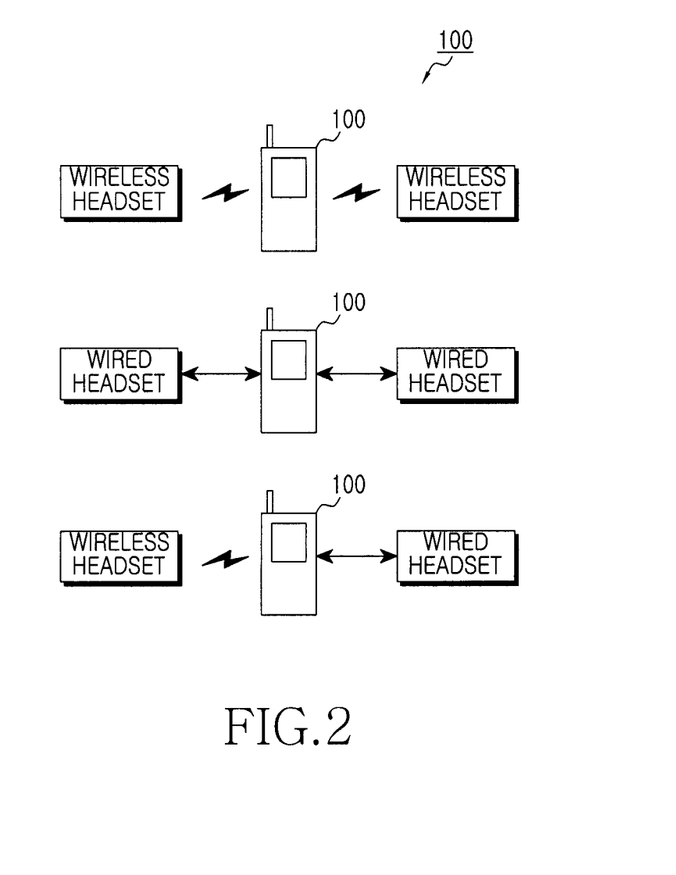
FIG. 2 is a diagram illustrating a simultaneous interpretation system according to an exemplary embodiment of the present invention.

FIG. 2 is a diagram illustrating a simultaneous interpretation system according to an exemplary embodiment of the present invention.

Referring now to FIG. 2, users who need the interpretation may connect their wired or wireless headset (hereafter, referred to as a wired/wireless headset) to a corresponding portable terminal 100 and communicate with each other with the headset put on.

When a first language user delivers a voice spoken to the portable terminal 100 through the corresponding wired/wireless headset, a second language user can receive the interpreted voice spoken by the first language user from the portable terminal 100. The wired/wireless headset includes a microphone for receiving the voice or the interpreted voice spoken by the user and outputting as a voice (audio) signal, and a speaker for outputting a voice signal received from another device to the user as the voice or the voice speech. The portable terminal 100 includes a microphone for receiving the voice signal output from the wired/wireless headset, and a speaker for outputting the corresponding voice signal to the outside. Hence, the portable terminal 100 receives the voice signal of the corresponding language from the corresponding wired/wireless headset and sends the voice signal interpreted to the corresponding language of the other wired/wireless headset user, to the other wired/wireless headset. Herein, the portable terminal 100 may also include an interpretation program for interpreting the voice spoken between the users. Alternatively, the portable terminal 100 may connect to the relevant interpretation server for interpreting the voice speech between the users. In other words, the portable terminal can interpreted by itself, or by connecting to the corresponding interpretation server and the wired/wireless headset for communicating with the portable terminal by wire and/or by wireless enable the conversation between the users who need the interpretation.

As shown in FIG. 2, the interpretation via the portable terminal may be conducted, for example between a wireless headset and another wireless headset, a wired headset and another wired headset, and/or a wireless headset and a wired headset. Besides the two wired/wireless headsets, the present invention is applicable to a plurality of wired/wireless headsets connectable to the portable terminal by wire or by wireless. That is, the present invention supports the simultaneous interpretation in a mutual conversation among the users who use the single portable terminal and the plurality of the wired/wireless headsets allowing the wired or wireless communications.

Figure 3:
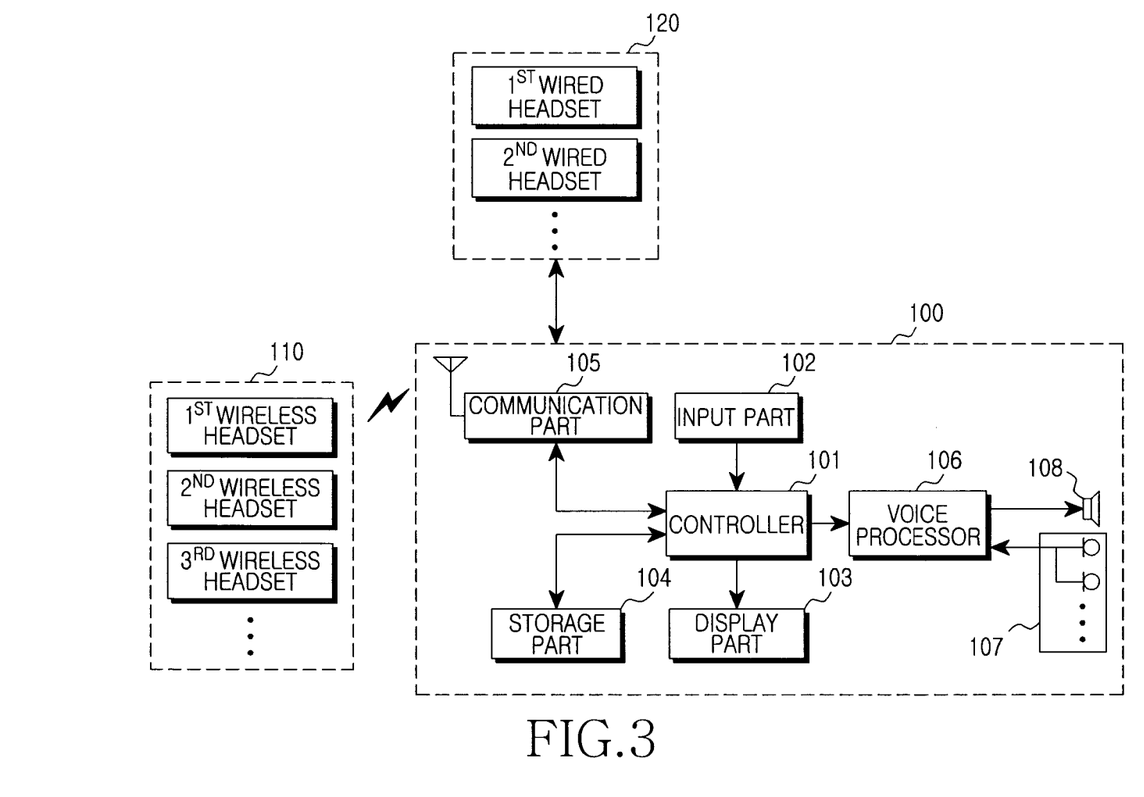
FIG. 3 is a block diagram illustrating a simultaneous interpretation service system according to an exemplary embodiment of the present invention.

FIG. 3 is a block diagram illustrating a simultaneous interpretation service system using the portable terminal according to an exemplary embodiment of the present invention.

Referring now to FIG. 3, the portable terminal 100 communicates with a plurality of wireless headsets 110 and/or a plurality of wired headsets 120. As stated earlier, the portable terminal 100 may include its own interpretation program for the simultaneous interpretation in the conversation. Alternatively, the portable terminal 100 may support the simultaneous interpretation between the wired/wireless headsets by accessing an interpretation server (not shown).

The portable terminal 100 may include a controller 101, an input part 102, a display part 103, a storage part 104, a communication part 105, and a voice processor 106.

The controller 101 controls the portable terminal 100. In particular, the controller 101 controls output of a selection screen for selecting the languages for the simultaneous interpretation in the display part 103 according to the corresponding input signal of the input part 102. When specific languages are selected, the controller 101 controls access to its own simultaneous interpretation program or automatically connects to a pre-designated interpretation server.

The input part 102 outputs the input signal for accessing the relevant simultaneous interpretation program, or the pre-designated interpretation server after the simultaneous interpretation languages are selected.

The display part 103 displays various information including the selection screen for selecting the simultaneous interpretation languages, under the control of the controller 101.

The storage part 104 stores data including parameters relating to the simultaneous interpretation. The storage part 104 may also store information relating to the simultaneous interpretation program. When detecting the corresponding input signal from the input part 102, the controller 101 may fetch or update the corresponding data from the storage part 104 and then store the data.

The communication part 105 is in charge of the wired or wireless communication between two wireless headsets, two wired headsets, and a wireless headset and a wired headset. Herein, the communication part 105 enables Bluetooth communications over different frequency bands between the wireless headsets.

The voice processor 106 inputs and outputs the voice signal under the control of the controller 101. The voice processor 106 receives the voice signal to interpret a voice spoken from the user corresponding to a wired/wireless headset via the communication part 105 in the simultaneous interpretation operation. Next, the voice processor 106 forwards the input voice signal to interpret to the simultaneous interpretation program, or to the communication part 105 to deliver the voice signal to the pre-designated simultaneous interpretation center. The voice processor 106 outputs the voice signal interpreted and fed from the simultaneous interpretation program or the simultaneous interpretation server. In further detail, the voice processor 106 may preferably include a microphone for receiving the voice signal and a speaker for outputting the voice signal.

The voice processor 106 may also include more than one microphone for receiving the voice signal. In this case, the voice processor 106 may specify in advance that the voice signal of a particular wired/wireless headset will be input to a particular microphone under the control of the controller 101. For instance, the first microphone can be preset to receive the voice signal corresponding to the first language from the wired/wireless headset of the first language user. By specifying the input of the voice signal of the wired/wireless headset of the corresponding language user to the corresponding microphone in advance, when the right voice signal of the corresponding language is input, it can be interpreted into the other language more efficiently. For example, it is assumed that the first microphone is preset to receive the voice signal of the language "A" and the second microphone is preset to receive the voice signal of the language "B". If the portable terminal 100 has the voice recognition capability which distinguishes the language, the portable terminal 100 may distinguish the voice signal coming from the corresponding wired/wireless headset and selectively receive the voice signal at the first microphone or the second microphone. The voice signal input is not limited to those inputs. The voice signal from the wired/wireless headset of the A-language user may be input to the first microphone and the voice signal from the wired/wireless headset of the B-language user may be input to the second microphone. Next, when the A-language user delivers its intention, the first microphone outputs the voice signal in the A-language corresponding to the intention. The voice signal of the A-language is applied to the simultaneous interpretation program of the portable terminal or the interpretation server and interpreted to the voice signal of the B-language. The voice signal of the interpreted B-language is transferred to the wired/wireless headset of the B-language user. The wired/wireless headset of the B-language user receives and voice signal of the B-language and outputs as the voice. The portable terminal 100 may send the voice signal of the A-language back, prior to the interpretation, to the wired/wireless headset of the A-language user. That is, the wired/wireless headset of the A-language user may re-receive the voice signal of the language a before the interpretation and produce as the voice so that the A-language user can re-confirm his/her intention to interpret.

Figure 4:
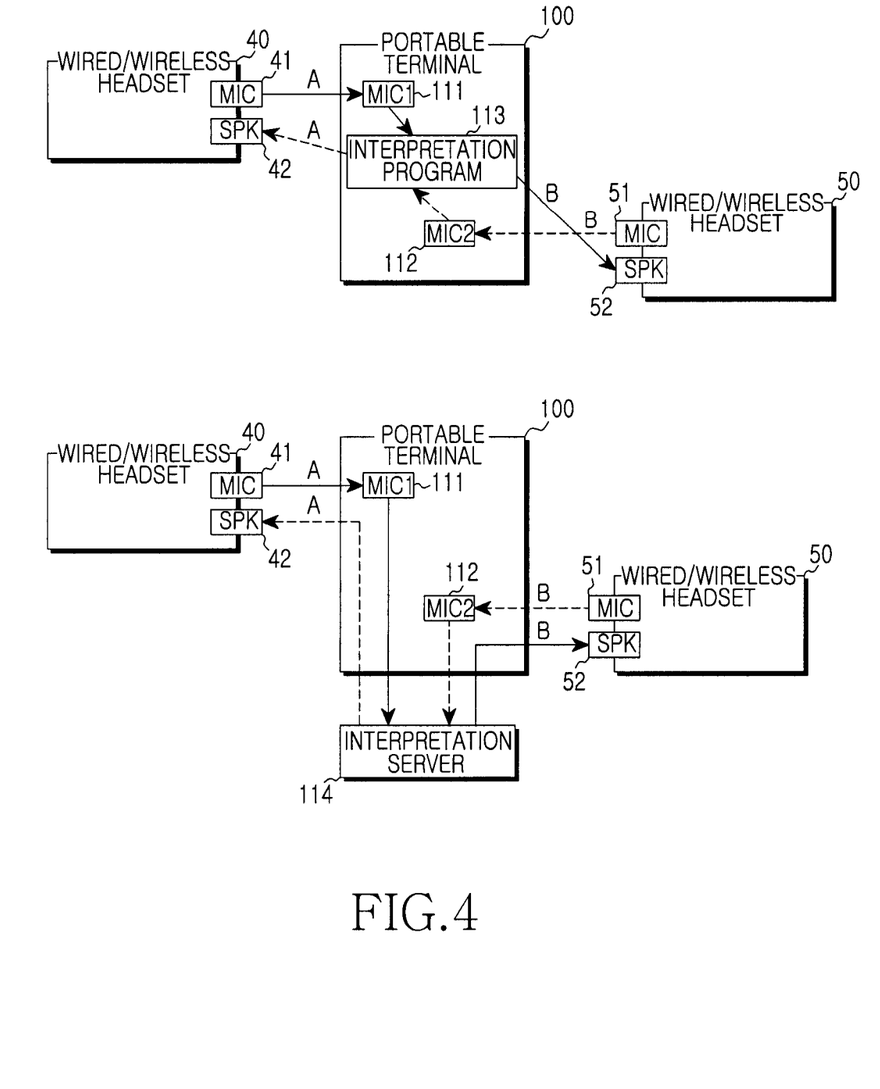
FIG. 4 is a diagram illustrating a simultaneous interpretation process according to an exemplary embodiment of the present invention.
Figure 5A:
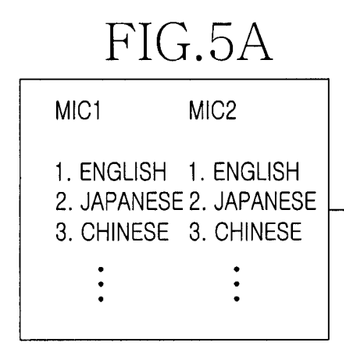
FIG. 5 is a diagram illustrating outputs on a display part of the portable terminal according to an exemplary embodiment of the present invention.
Figure 5B:
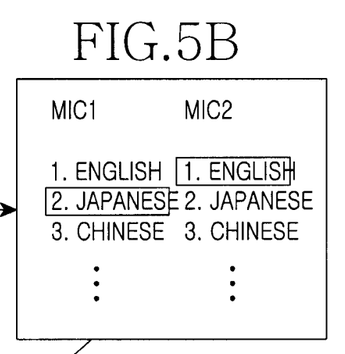
Figure 5C:
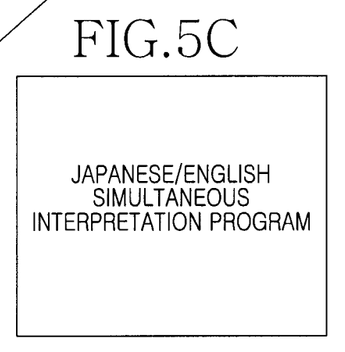
Figure 5D:
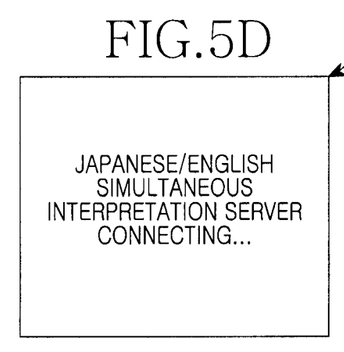

FIG. 4 is a diagram illustrating the simultaneous interpretation process according to an exemplary embodiment of the present invention.

Referring now to FIG. 4, a portable terminal 100 communicates with the wired/wireless headsets 40/50 by wire or by wireless protocol. The wired/wireless headsets 40/50 may include microphones 41, 51 for receiving the voice of the user and outputting as the voice signal and speakers 42 and 52 for outputting the corresponding voice signal to the user as the voice. The portable terminal 100 also includes a first microphone 111 (MIC1) and a second microphone 112 (MIC2) for receiving the voice signal from the microphones 41, 51 of the wired/wireless headsets 40/50 connected by wired or by wireless by classifying the voice signal based on the language. The portable terminal 100 may also contain an interpretation program 113 for interpreting the voice signal of the corresponding language and outputting the voice signal of the other language, or communicate with an interpretation server 114 which provides the interpretation service.

The voice signal of the A-language output from the microphone 41 of the first wired/wireless headset 40 is input to the pre-designated first microphone 111 of the portable terminal 100. Herein, the portable terminal 100 may be preset such that the first wired/wireless headset 40 can exclusively use the first microphone 111. The portable terminal 100 may designate the first microphone 111 based on the language classified using the voice recognition. The voice signal of the A-language fed to the first microphone 111 is interpreted to the voice signal of the B-language through the interpretation program of the portable terminal 100 and produced as the voice in the B-language through the speaker 52 of the second wired/wireless headset 50, which is not limited to this case. The voice signal of the A-language fed to the first microphone 111 may be transferred to the interpretation server 114 accessed by the portable terminal 100, interpreted to the voice signal of the B-language at the interpretation server 114, and then delivered to the portable terminal 100. Next, the portable terminal 100 sends the voice signal of the B-language interpreted from the interpretation server 114 to the second wired/wireless headset 50. The second wired/wireless headset 50 outputs the voice signal of the B-language as the voice through the speaker 52.

FIG. 5 is a diagram illustrating outputs on the display part of the portable terminal according to an exemplary embodiment of the present invention.

Referring now to FIG. 5, the portable terminal 100 includes two microphones for receiving the voice signals. When the portable terminal has the voice recognition function for distinguishing among the languages, the each microphone may selectively be preset to be input the corresponding language. Furthermore, as aforementioned, each microphone may respectively select the corresponding wired/wireless headset outputting the voice signal of the corresponding language.

In series of the processes (A), (B) and (C) of FIG. 5, the user selects the languages to input to the respective microphones of the portable terminal. Next, the interpretation between the selected languages is carried out by the simultaneous interpretation program of the portable terminal.

In series of the processes (A), (B) and (D) of FIG. 5, the user selects the languages to input to the respective microphones of the portable terminal. Next, interpretation between the selected languages can be supported by accessing the external interpretation server at the portable terminal.

Figure 6:
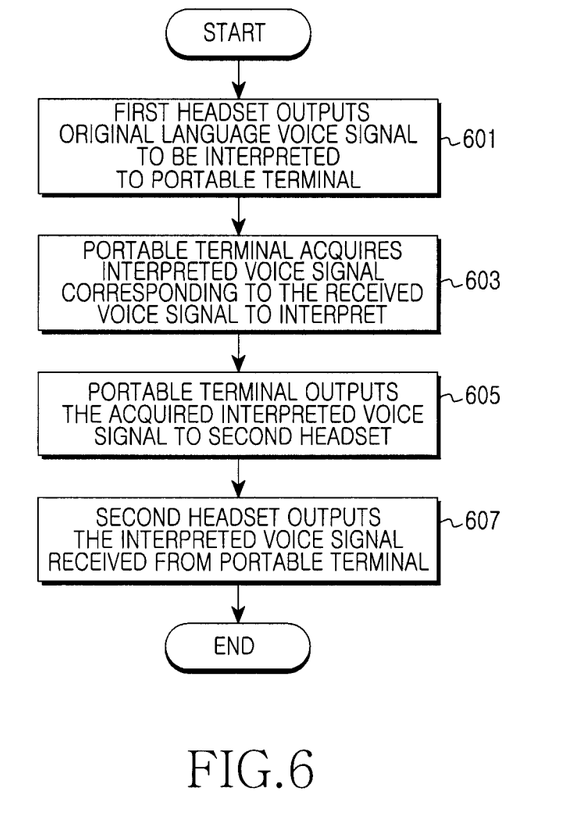
FIG. 6 is a flowchart illustrating an exemplary operation of a method of the simultaneous interpretation system according to an exemplary embodiment of the present invention.

FIG. 6 is a flowchart illustrating an exemplary operation of a method of the simultaneous interpretation system according to an exemplary embodiment of the present invention. The simultaneous interpretation system in this particular example includes a portable terminal and two or more headsets for communicating with each other by wire or by wireless by medium of the portable terminal.

In step 601, the first headset outputs the original language voice signal to the portable terminal to be interpreted.

In step 603, the portable terminal acquires the interpreted voice signal corresponding to the original voice signal received from the first headset. As stated earlier, the portable terminal can acquire the corresponding interpreted voice signal using its own interpretation program or by accessing the external interpretation server.

Next, the portable terminal outputs the acquired interpreted voice signal to the second headset in step 605, and the second headset outputs the interpreted voice signal received from the portable terminal in step 607.

The operating method of the simultaneous interpretation system may further include retransmitting the original language voice signal to interpret to the first headset concurrently with or after outputting the corresponding interpreted voice signal to the second headset. Namely, the first headset can reconfirm the original language voice signal to be interpreted.

In conclusion, the simultaneous interpretation system achieves the simultaneous interpretation using the short-range communication between the users by medium of the single portable terminal and thus realizes the efficient and unrestricted conversation.

While the invention has been shown and described with reference to certain exemplary embodiments thereof, it will be understood by those skilled in the art that various changes in form and details may be made therein without departing from the spirit and scope of the invention as defined by the appended claims and their equivalents. For example; the original language voice speech signal can be translated/interpreted into a plurality of languages and provided to respective headsets of users who speak respectively different languages, and/or dialects of the same language. In fact, the term language and dialect should be considered as being interchangeable in the appended claims. Also, as the interpretation capability of the portable terminal may be limited, when a certain language is requested that is rarely spoken or spoken by a very small percentage of the world population, the interpretation may be performed by the interpretation server. Preferably, there would be a pre-designation of such languages outside of the translation capability of the portable terminal so the server is automatically connected to acquire an interpreted voice speech signal in the language of a particular headset that will receive the interpreted language. Therefore, the scope of the invention is defined not by the detailed description of invention but by the appended claims, and all differences within the scope will be construed as being included in present invention.

What is claimed is:

1. A simultaneous interpretation system, comprising:
   a plurality of headsets for inputting and outputting voice speech signals; and
   a portable terminal configured for receiving output from the first headset of an original language voice speech signal to be interpreted/translated, and for outputting to the second headset an interpreted language voice speech signal in a first translated language based on the original language voice speech signal,
   wherein the portable terminal is configured to operate a short range wireless communication to communicate with headsets of a respective speaker and a listener of the plurality of headsets in which the portable terminal translates between a plurality of pre-designated languages, and wirelessly communicates with an interpretation server for translation between languages other than the plurality of pre-designated languages.

2. The simultaneous interpretation system of claim 1, wherein the portable terminal has an interpretation program which interprets the original language voice speech signal into the interpreted language voice speech signal.

3. The simultaneous interpretation system of claim 1, further comprising:
   the interpretation server interprets the original language voice speech signal output from the first headset,
   wherein the portable terminal acquires the interpreted voice speech signal by accessing the interpretation server and providing the original language voice speech signal to be interpreted and indicates the interpreted language to which the original language speech signal is to be interpreted.

4. The simultaneous interpretation system of claim 1, wherein the portable terminal communicates with the plurality of headsets by wire or wireless protocol.

5. The simultaneous interpretation system of claim 1, wherein the portable terminal communicates with the plurality of headsets via Bluetooth.

6. The simultaneous interpretation system of claim 1, wherein the portable terminal outputs the interpreted voice speech signal or the original language voice speech signal to a third headset.

7. The simultaneous interpretation system of claim 1, wherein one of the original language voice speech signal or the interpreted language voice speech signal is interpreted into a second translated language and output to a third headset.

8. The simultaneous interpretation system of claim 1, where the original language and the interpreted language are dialects of a common language.

9. The simultaneous interpretation system of claim 1, wherein the portable terminal outputs the interpreted voice speech signal corresponding to a language required by the second headset.

10. The simultaneous interpretation system of claim 1, wherein the portable terminal comprises a designated microphone for receiving the voice speech to be interpreted that is output from the first headset.

11. The simultaneous interpretation system of claim 1, wherein the portable terminal comprises one or more microphones for receiving the voice speech signal to be interpreted, and the one or more microphones are used by distinguishing the voice speech to be interpreted based on a language type.

12. The simultaneous interpretation system of claim 1, wherein, when outputting the interpreted voice speech signal to the second headset, the portable terminal re-sends the original voice speech signal to the headset for confirmation purposes prior to the interpretation being performed.

13. The simultaneous interpretation system of claim 2, wherein the portable terminal comprises:
   an input part for outputting an input signal to select at least one language for the simultaneous interpretation;
   a communication part for allowing communications between the wired/wireless headsets;
   a display part for outputting a selection screen to select the at least one language for the simultaneous interpretation between the wired/wireless headsets;
   a voice processor which receives the original language voice speech signal from one or more microphones to be interpreted from the wired/wireless headset, and a speaker which outputs the interpreted voice speech signal; and
   a controller for detecting a corresponding input signal of the input part, and converting the original language voice speech signal into an interpreted voice speech signal of the first translated language.

14. The simultaneous interpretation system of claim 13, wherein the headsets provide a default language for the portable terminal to use prior to or concurrently with the original language voice speech signal.

15. The simultaneous interpretation system of claim 3, wherein the portable terminal comprises:
   an input part for outputting an input signal to select at least one language for the simultaneous interpretation and to access the interpretation server;
   a communication part for allowing communications between the wired/wireless headsets and communications with the interpretation server;
   a display part for outputting a selection screen to select the at least one language for simultaneous interpretation between the wired/wireless headsets;
   a voice processor for receiving the original language voice speech signal to be interpreted from one or more microphones, and a speaker for outputting the interpreted voice speech signal; and a controller for detecting a corresponding input signal of the input part and controlling to automatically connect to the interpretation server when particular languages for the simultaneous interpretation are selected.

16. A portable terminal comprising:
one or more microphones for receiving an original language voice speech signal to be interpreted from outside by classifying the voice speech based on a language;
a speaker for outputting an interpreted language voice speech signal; and
a controller for controlling to interpret the voice speech to interpret input to the microphone using an interpretation program of the portable terminal or by accessing an external interpretation server, and to output the interpreted voice speech to the speaker,
wherein the portable terminal is configured to operate a short range wireless communication to communicate with the one or more microphones of a respective speaker and at least one listener in which the portable terminal translates between a plurality of pre-designated languages, and wirelessly communicates with an interpretation server for translation between languages other than the plurality of pre-designated languages.

17. An operating method of a simultaneous interpretation system comprising a portable terminal and two or more headsets which communicate with each other by wire or by a wireless medium of the portable terminal, the method comprising:
outputting, at the first headset, an original language voice speech signal to be interpreted to the portable terminal;
acquiring, at the portable terminal, an interpreted language voice speech signal based on the original language voice speech signal received from the first headset;
outputting, at the portable terminal, the acquired interpreted voice speech signal to the second headset; and
outputting, at the second headset, the interpreted voice speech signal received from the portable terminal,
wherein the portable terminal is configured to operate a short range wireless communication to communicate with the two or more headsets of a respective speaker and at least one listener in which the portable terminal translates between a plurality of pre-designated languages, and wirelessly communicates with an external interpretation server for translation between languages other than the plurality of pre-designated languages.

18. The operating method of claim 17, wherein the acquiring of the interpreted voice speech signal based on the original language voice speech signal received from the first headset at the portable terminal comprises:
acquiring a corresponding interpreted voice speech signal by using an interpretation program of the portable terminal or by accessing the external interpretation server for interpretation of the original language voice speech signal.

19. The operating method of claim 17, further comprising:
re-sending the original language voice speech signal to be interpreted to the first headset concurrently with or after outputting the corresponding interpreted voice signal to the second headset.

20. The operating method of claim 17, further comprising:
re-sending the original language voice speech signal to be interpreted to the first headset for confirmation purposes prior to performing an interpretation.

* * * * *